US009454173B2

United States Patent
Angerame et al.

(10) Patent No.: US 9,454,173 B2
(45) Date of Patent: Sep. 27, 2016

(54) PREDICTIVE ALERT SYSTEM FOR BUILDING ENERGY MANAGEMENT

(71) Applicant: UTILITY PROGRAMS AND METERING II, INC., New York, NY (US)

(72) Inventors: Christopher John Angerame, North Bergen, NJ (US); David John Harroun, Wales, WI (US)

(73) Assignee: Utility Programs and Metering II, Inc., New York, NY (US)

( * ) Notice: Subject to any disclaimer, the term of this patent is extended or adjusted under 35 U.S.C. 154(b) by 617 days.

(21) Appl. No.: 13/899,977

(22) Filed: May 22, 2013

(65) Prior Publication Data

US 2014/0350738 A1    Nov. 27, 2014

(51) Int. Cl.
| | |
|---|---|
| *G05D 3/12* | (2006.01) |
| *G05F 1/66* | (2006.01) |
| *G05B 13/04* | (2006.01) |
| *G05D 23/19* | (2006.01) |
| *F24D 19/10* | (2006.01) |
| *G06Q 50/06* | (2012.01) |

(52) U.S. Cl.
CPC ............ *G05F 1/66* (2013.01); *F24D 19/1048* (2013.01); *G05B 13/04* (2013.01); *G05B 13/048* (2013.01); *G05D 23/1904* (2013.01); *G05D 23/1923* (2013.01); *G06Q 50/06* (2013.01); *G05B 2219/2639* (2013.01); *G05B 2219/2642* (2013.01)

(58) Field of Classification Search
CPC .. G06Q 10/04; G06Q 30/0283; G05B 15/02; G05B 2219/2642; G05B 17/02; G05B 13/04; G05B 13/048; G05B 2219/2614; G05B 2219/49068; H02J 2003/003

See application file for complete search history.

(56) References Cited

U.S. PATENT DOCUMENTS

| | | | |
|---|---|---|---|
| 4,207,557 A | 6/1980 | Gilkson | |
| 4,399,510 A | 8/1983 | Hicks | |
| 4,701,698 A | 10/1987 | Karlsson | |
| 5,289,362 A | 2/1994 | Liebl et al. | |
| 5,519,622 A | 5/1996 | Chasek | |
| 6,052,671 A | 4/2000 | Crooks et al. | |
| 6,311,105 B1 | 10/2001 | Budike, Jr. | |
| 6,366,889 B1 | 4/2002 | Zaloom | |
| 6,429,642 B1 | 8/2002 | Rodilla Sala | |
| 6,535,817 B1 * | 3/2003 | Krishnamurti | G01W 1/10 702/3 |
| 6,622,097 B2 | 9/2003 | Hunter | |
| 6,904,385 B1 | 6/2005 | Budike, Jr. | |
| 6,922,558 B2 | 7/2005 | Delp | |
| 6,996,508 B1 * | 2/2006 | Culp | G06Q 50/06 700/291 |
| 7,039,532 B2 | 5/2006 | Hunter | |
| 7,043,459 B2 | 5/2006 | Peevey | |
| 7,049,976 B2 | 5/2006 | Hunt et al. | |
| 7,050,932 B2 * | 5/2006 | Selby | G06Q 40/08 702/179 |
| 7,135,956 B2 | 11/2006 | Bartone et al. | |
| 7,222,111 B1 | 5/2007 | Budike, Jr. | |
| 7,317,404 B2 | 1/2008 | Cumeralto et al. | |
| 7,668,671 B1 | 2/2010 | Gristina | |
| 7,774,245 B2 | 8/2010 | Voysey | |

(Continued)

*Primary Examiner* — Darrin Dunn
(74) *Attorney, Agent, or Firm* — Boyle Fredrickson, S.C.

(57) ABSTRACT

A system for managing energy use of buildings and the like uses predicted meteorological data, for example from weather forecasts, applied to models of the energy systems of the building to predict future energy use and costs. This predicted information is used to produce automatic alerts allowing future energy use to guide current changes to reduce energy.

17 Claims, 6 Drawing Sheets

(56) References Cited

U.S. PATENT DOCUMENTS

| | | | |
|---|---|---|---|
| 2002/0099821 A1* | 7/2002 | Hellerstein | H04L 12/2602 709/224 |
| 2008/0183311 A1* | 7/2008 | MacArthur | G05B 17/02 700/29 |
| 2008/0224892 A1 | 9/2008 | Bogolea | |
| 2011/0161251 A1* | 6/2011 | Carey | G06Q 10/06 705/412 |
| 2011/0246381 A1* | 10/2011 | Fitch | G06Q 10/04 705/313 |
| 2011/0282731 A1* | 11/2011 | Guglielmi | G06Q 30/0244 705/14.43 |
| 2012/0010758 A1* | 1/2012 | Francino | G05B 17/02 700/291 |
| 2012/0158631 A1* | 6/2012 | Pitcher | G06F 17/5009 706/21 |
| 2012/0278051 A1* | 11/2012 | Jiang | G06Q 10/04 703/2 |

\* cited by examiner

PREDICTIVE ALERT SYSTEM FOR BUILDING ENERGY MANAGEMENT

BACKGROUND OF THE INVENTION

The present invention relates to energy management systems for buildings and the like and in particular to an energy management system that provides predictive alerts with respect to energy usage.

Sophisticated management of energy usage of large buildings and the like can provide substantial cost savings and environmental benefits. To this end, computerized control systems may monitor data related to the building environment, for example temperatures and humidities, and provide near real-time control of energy systems including heating, ventilation, and air conditioning equipment, to balance energy usage with a desired building environment.

Historical energy usage by a building may also be monitored and reviewed to identify possible inefficiencies. Once these inefficiencies are found, energy systems can be restructured and/or control algorithms or operating procedures used for the control of those systems may be changed.

While significant advances have taken place with respect to the control of building energy systems, the complexity of the energy systems and the need to flexibly respond to unexpected situations normally require input from a building engineer or the like who may monitor the operation and performance of the equipment on a day-to-day basis and make necessary changes and adjustments. When the building engineer needs to intervene in the control of the energy systems, there is often little warning and the engineer may have limited ability to fully evaluate the necessary adjustments before making them. Further, instantaneous change in the operating state of the energy systems is normally not possible further limiting the options available to the building engineer.

SUMMARY OF THE INVENTION

The present invention provides an energy monitoring system that may produce predictive alerts to the building engineer or the like such as may anticipate problems that may need response. This predictive capacity allows adjustments to the energy management equipment that may largely avoid problems before they occur with reduced loss and operating efficiency.

Practical predictive alerts are provided by applying meteorological forecasts to a model of the energy management system. Meteorological forecasting is well-established and readily obtained and represents a significant parameter affecting the future operation of the energy management equipment.

Specifically then, the present invention provides an apparatus for managing energy systems for buildings and the like comprising an electronic computer executing a program stored in a non-transient medium to receive, first, data inputs of real-time measured parameters of the energy systems and, second, data inputs of current and predicted local meteorological information. The predicted local meteorological information and real-time measured parameters are applied to a model of the energy system to produce predicted measured parameters of the energy system and the predicted measured parameters are in turn applied to alert rules to generate alerts related to future avoidable energy cost increases. The alerts may provide a description of the future avoidable cost increase and a prediction time associated with a predicted time of the future avoidable energy cost increase are then output.

It is thus an object of at least one embodiment of the invention to provide advance notice to building engineers or the like by leveraging the power of sophisticated meteorological forecasts in predicting energy usage.

The model may consist of historical operating data of the energy system providing a functional relationship between meteorological data and energy usage.

It is thus an object of at least one embodiment of the invention to provide a procedural method of producing a model that can be implemented in a variety of complex energy systems.

The model may include at least two submodels, a first submodel relating meteorological data to output of the energy system and the second submodel relating output of the energy system to energy use of the energy system and wherein each model is obtained by a regression fit to historical data.

It is thus an object of at least one embodiment of the invention to link readily measured parameters of the energy system such as tonnage to energy use that will permit cost sensitive analysis.

The model may further include operating rules describing a selection among different corresponding submodels associated with different configurations of the energy system based on the meteorological data and reflecting expected different configurations of the energy system in response to different meteorological conditions.

It is thus an object of at least one embodiment of the invention to incorporate into the model current best operating procedures not easily captured by simple regression and the like alone.

The operating rules may change sub-models according to different ranges of meteorological data.

It is thus an object of at least one embodiment of the invention to permit piecewise construction of a model that can work under a variety of different environmental conditions.

The electronic computer may further execute the stored program to output to a user the predicted measured parameters based on different operating rules to provide a comparison of future performance under different operating rules.

It is thus an object of at least one embodiment of the invention to employ the same mechanism for "what-if" type analysis to analyze efficient operation of the energy systems.

The electronic computer may further execute the program to compare predictions of the model to later actual measurements of the energy system and to provide at least one of an alert indicating disparity between the predictions and the actual measurements, a selection of a different model, and a cumulative ranking of models.

It is thus an object of at least one embodiment of the invention to provide a check of model drift or inaccuracy that may be formed on an automatic basis.

The execution of the stored program may further correct the predicted local meteorological information based on previous comparisons of previous predicted local meteorological information and actual meteorological information at the time indicated by the previous prediction.

It is thus an object of at least one embodiment of the invention to provide an automatically adjusting model to improve accuracy over time.

The electronic computer may further execute to repeatedly apply the predicted local meteorological information and real-time measured parameters of the first and second inputs to the model to produce new predicted measured parameters of the energy system at multiple times throughout a day.

It is thus an object of at least one embodiment of the invention to eliminate cumulative prediction error by repeated iteration using new data.

The electronic computer may further monitor the real-time measured parameters for error selected from the group consisting of sensor data that is missing, sensor data that is unvarying and sensor data that is out of range to provide an alert of such error.

It is thus an object of at least one embodiment of the invention to provide a system that can detect within limits erroneous inputs that may affect the modeling process.

The alerts may indicate a projected change in energy costs categories according to a utility rate table.

It is thus an object of at least one embodiment of the invention to incorporate often arcane utility schedules into the modeling process and alert process.

The alerts may include cost values indicating a cost significance of not responding to the alert based on a utility rate table It is thus an object of at least one embodiment of the invention to provide a readily available reference for the significance of the alert in terms of energy cost.

The electronic computer may further output to a user the predicted measured parameters.

It is thus an object of at least one embodiment of the invention to provide a general-purpose prediction tool for use in managing energy systems.

The computer may apply predicted local meteorological information to a second model of the energy system to produce predicted electrical and steam cogeneration wherein the output from the second model provides an input to the first model.

It is thus an object of at least one embodiment of the invention to permit sophisticated cogeneration systems that may fundamentally affect energy costs to be analyzed on a predicted basis.

The meteorological data may be selected from the group consisting of wet bulb temperature and dry bulb temperature of the air outside of a structure serviced by the energy system.

It is thus an object of at least one embodiment of the invention to provide models that may make use of objective and readily obtainable forecast data.

The real-time measured parameters may be selected from the group consisting of cooling system output tonnage, electrical power usage, steam power usage, and activation of particular energy system components.

It is thus an object of at least one embodiment of the invention to use parameters that are typically available in sophisticated energy management environments The model of the energy system may be selected from the group consisting of models of energy systems of furnaces, boilers, air-conditioning units, chilled water chillers, and cogeneration facilities and combinations of these energy systems.

It is thus an object of at least one embodiment of the invention to provide a predictive alert system applicable to a wide variety of significant energy systems.

These particular objects and advantages may apply to only some embodiments falling within the claims and thus do not define the scope of the invention.

DETAILED DESCRIPTION OF THE PREFERRED EMBODIMENT

Figure 1:
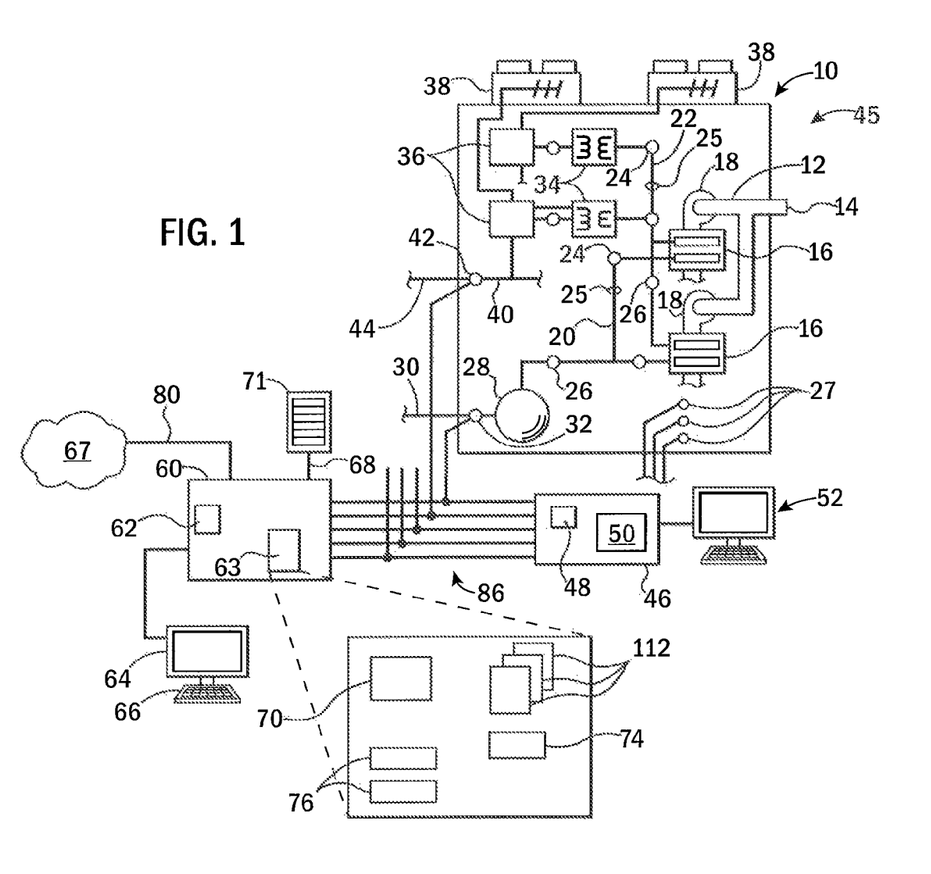
FIG. 1 is a simplified block diagram of a building having a heating and cooling energy system as controlled by a building controller and as monitored by a computer implementing the present invention.

Referring now to FIG. 1, a building 10 such as a high-rise office building, factory, server farm or the like may provide for a ventilation system 12, for example, having an air intake 14 receiving outside and recycled inside air and passing it in different ventilation ducts. The ventilation ducts may pass through heat exchangers 16 that may heat or cool the air in each of the ventilation ducts for distribution to the interior of the building 10, for example, under the control of multiple fans 18 and manual or motorized duct valves (not shown).

The heat exchangers 16 may receive a source of heated water 20 or chilled water 22 (for example through separate exchange elements) for heating or cooling under the control of one or more valves 24. The heated water 20 may, for example, be pumped by a pump 26 from a boiler 28, the latter receiving a source of fuel 30 such as natural gas, oil, or the like through a fuel meter 32. The chilled water 22 may come from a water chiller 34 fed by compressor units of an air-conditioning unit 36 (holding a thermostatically controlled compressor), the latter exhausting heat through cooling towers 38 or the like. The heated water 20 or chilled water 22 may have its temperatures monitored by one or more temperature sensors 25.

The various electrical equipment including the air-conditioning units 36 may receive electrical service 40 from electrical service 44 monitored by electrical meter 42. Each of these electronically actuable or electronically readable elements and their associated equipment together comprise an energy system 45 for providing control of energy (e.g. heating and cooling) to the building.

A building controller 46 in communication with the above sensors and actuators provides control of the same on an automatic or semiautomatic basis. The building controller 46 may include an electronic computer having a processor 48 and memory 50, the latter holding a stored control program held in non-transitory media such as electronic disk or electronic memory. The controller 46 may communicate with a control console 52, for example, providing a graphic display terminal and user input device such as a keyboard or the like.

The building controller 46 may receive electronic signals from each of the above-described components or manually entered data read from such components to obtain an understanding of the building state 86. In this regard, the building controller 46 may monitor the temperatures of the chilled water 22 and heated water 20 through temperature sensors 25 and may monitor interior space temperatures and humidity through in-room monitors 27. The controller 46 may also monitor fuel usage through meters 32 and 42 although this may not be used in its control capacity. This building state 86 is input to a control algorithm executing on the building controller 46 to provide for real-time control of the energy system 45.

In response to the control algorithm, the building controller 46 may control the fans 18 and associated duct valves, the activation of valves 24 for controlling chilled and heated water, the pump 26 activation of the boiler 28 and motors and valves of the individual air-conditioning unit 36. Secondary control loops may be established, for example, between fans of the cooling towers 38 and the air-conditioning units 36, for example, by local controllers which may be practically considered a portion of the building controller 46. Building controllers 46 for controlling energy systems 45 are generally understood in the art and may use a variety of different control algorithms, for example, implementing all or portions of proportional, integral, and derivative control strategies, for example.

The present invention supplements the control of the energy system 45 implemented by the building controller 46 and may, in fact, be executed on the building controller 46 but more typically will be implemented on a second computer 60. The second computer 60 may also have a processor 62 and a memory 63 holding various data files and a program implementing the present invention as will be discussed further below. Computers 60 may communicate with standard human machine interface (HMI) elements including a display 64 and keyboard 66 for presenting information to a human operator and receiving commands from the operator, respectively. In one embodiment, the computer 60 may be directly connected to each of the energy system 45 components monitored or actuable by the controller 46 so as to be able to obtain information about the current building state 86 of the building 10 and its energy system 45.

The computer 60 may also receive current meteorological data 68, for example, from local weather instrumentation 71, the latter, for example, providing equipment that provides local wet bulb and dry bulb information proximate to the building 10. Ideally, this information is directly obtained with respect to the local building environment but may also be derived from general-purpose weather sources interpolated to the building region. The computer 60 may also be connected, for example, through the Internet 67 with a source of predicted meteorological data 80, for example, from a commercial weather prediction service. In one embodiment, predicted data may be from a government source such as the National Oceanic and Atmospheric Administration (NOAA) and a commercial source such as Weather Underground combined and localized to the building 10.

It will be appreciated that the computer 60 need not necessarily be on site and that this building state 86, predicted meteorological data 80, and current meteorological data 68 may be relayed, for example, over the Internet or the like and further that the tasks that will now be described with respect to computer 60 may be distributed over multiple computers if desired. It will be further appreciated that some of this data may be collected manually.

Generally, the memory 63 of the computer 60 will hold an operating program 70 whose operation will be described below together with multiple submodels 112 that may be assembled into a building model 84 by using stored operating rules 74. Generally, the submodels 112 provide a mapping between the building state 86 and energy usage by the building 10 under a predefined set of operating conditions. The operating rules 74 describe those operating conditions that capture general strategies for the control of the energy system 45, for example, providing a priority in usage of different air-conditioning units 36 or choice between different fuels, or advanced cooling or heating based on temperature or temperature trends.

The memory 63 will also hold various other data files 76 including rate table information, model accuracy information, and correction factors, all as will be described below.

Figure 2:
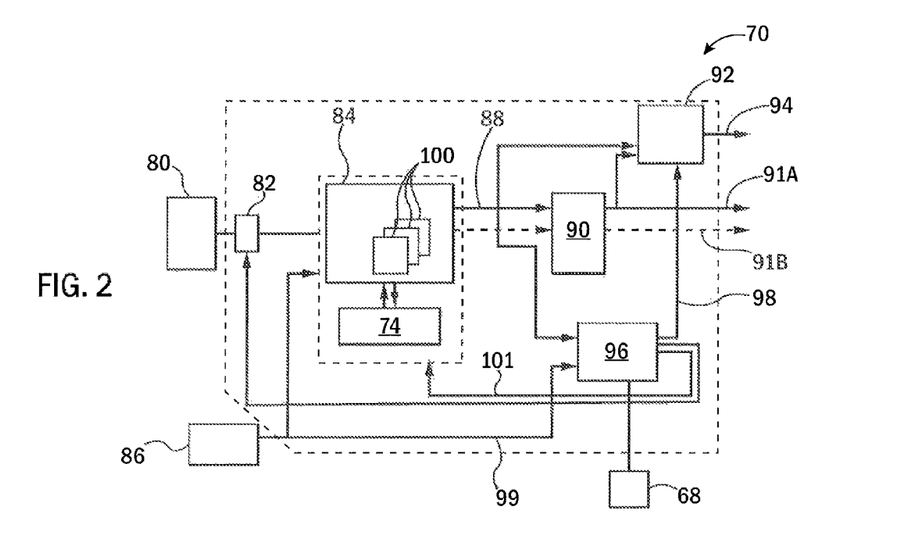
FIG. 2 is a diagram of the functional blocks of the program implemented by the computer of FIG. 1 showing a set of models that may receive predicted weather data to provide predicted energy consumption and further showing a rate table for converting energy consumption into cost, an alert generator monitoring the outputs of the models, and a model monitor monitoring and correcting model accuracy.
Figure 8:
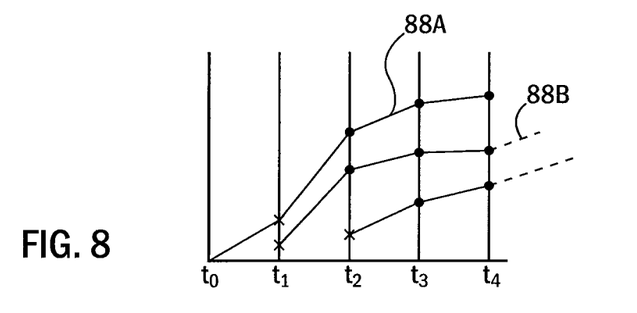
FIG. 8 is a graph of output prediction at multiple times showing correction of each prediction with actual operating data in an iterative process.

Referring now to FIGS. 2 and 8, the program 70 operates to receive predicted meteorological data 80, for example, predicting the weather twelve hours in advance at one hour increments $(t_0\text{-}t_4)$. This information is processed by a weather correction function 82 which will be described below and then provided to a building model 84. The building model 84 also receives the current building state 86 representing generally the electronic state of the building 10 reflected in the various electrically actuated elements described above such as the pumps 26 and valves 24 and data from the various temperature sensors 25 and meters 42, for example.

For example, current building information at time $t_0$ may be received by the building model 84. Using the current building state 86 and first increment of predicted meteorological data 80 (for example one hour hence at time $t_1$) the building model 84 produces a predicted energy usage 88 for each of one hour into the future at time $t_1$ and the succeeding four hours in the future $t_4$ as shown by predicted energy usage 88a in FIG. 8. This prediction may be made recursively, with predictions for each succeeding hour being used as initial conditions for the predictions for the next hour.

As time passes, for example, so that the current time is now time $t_1$, predictions for additional hours into the future may be refreshed recursively using current meteorological data 68 for time $t_1$, actual building state 86 for time $t_1$ and updated predicted meteorological data 80, for example, to produce predictions shown by predicted energy usage 88b.

Alerts may be generated for any time throughout the prediction span (initially $(t_0\text{-}t_4)$) by the alert generator 92 monitoring the most current predicted energy usage 88. Generally the alert generator 92 incorporates a set of Boolean and/or arithmetic conditions, for example that may be implemented in a script, to monitor the prediction data and provide warnings to the operator based on those Boolean and/or arithmetic conditions. For example, a simple alert may generate a warning if energy consumption values are expected to be above a certain value. The alert may identify the particular condition and the time at which the condition will occur. These alerts may be displayed on the display 64 or sent by e-mail or conveyed in other manners to a human operator. Any previous alerts based on earlier predicted energy usage 88 are retracted but may be stored in an historical log table.

The predicted energy usage 88 will be provided to a rate table 90 providing current energy usage rates, for example, kilowatts of electricity or BTUs of natural gas or the like, into predicted energy costs 91. This predicted energy cost 91 may be displayed to the user as will be described below.

Figure 6:
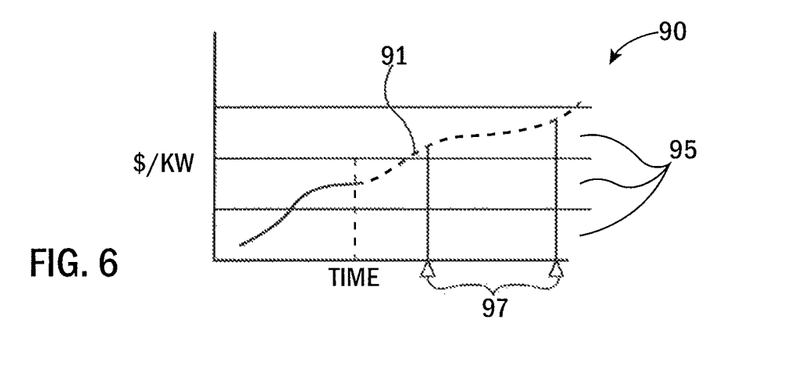
FIG. 6 is a simplified representation of a rate table showing rate tiers and showing one set of alert rules for the alert generator generating alerts based on transition through rate tiers.

The alert generator 92 may also monitor predicted energy cost 91 to provide alerts based on the predicted energy cost 91 in the same manner as described above with respect to predicted energy use 88. Referring momentarily to FIG. 6, in a typical rate table 90 providing electrical rates, the cost of each kilowatt of electrical power may change depending on the total number of kilowatts consumed according multiple different kilowatt tiers 95 providing abrupt price changes between those tiers 95 increasing disproportionately as one rises through the tiers 95. This price structure reflects the high marginal cost of additional electrical generation capacity under peak demands.

In addition, the predicted energy cost 91 may reflect a "demand" agreement between the electrical utility and a commercial user of the building 10. A demand agreement is a contract between the user and the electrical utility. Under this contract, when the electrical utility needs additional power, it may contact its customers subject to the demand agreement with a request that the customer reduce its energy usage in the future for a predetermined time. This agreement provides advantageous prices but contains penalties when those requests are not met. Those penalties are incorporated into the predicted energy cost 91.

In addition, the rate table 90 may provide for "real time" utility pricing in which the utility transmits changing cost per kilowatt and per kilowatt hour for the next 24 hours. That is, the rate table 90 may be arbitrarily dynamic.

An example alert generated by the alert generator 92 may compare predicted energy cost 91 against the defined ranges of the tiers 95 to provide an alert at times 97 where the projected cost will rise to the next tier 95. This allows the building engineer, for example, to take steps before that crossing time to decrease electrical consumption. Other alerts may include, for example, the use of particular pieces of equipment representing known inefficient operating modes of the equipment, energy usage at particular times of the day beyond a certain amount, and any logical or arithmetic combination of the monitored parameters representing the building state 86.

A model monitor 96 may also receive the predicted energy usage 88 and actual energy usage 99, the latter derived from the building state 86, and may compare the two for the same time period by storing and holding the predicted energy usage 88 values so that they may be compared with the actual energy usage 99. This comparison allows assessment of the accuracy of the prediction by the building model 84 after the fact. As will be discussed below, the outcome of the comparison may be used to create a model failure report 98 that may be sent to the alert generator 92 used to generate an alert 94 in the event that the modeling is beyond certain pre-established ranges of accuracy.

Referring still to FIG. 2, the building model 84 may be selected from multiple alternative models 100 typically each founded on use of a set of different operating rules 74 as will be discussed below. In this case, the model monitor 96, as well as providing warnings about model inaccuracy, may control selection among different alternative models 100 used for the building model 84 or may correct given models used for the building model 84 by selection/correction command 101 provided from the model monitor 96 to the to the building model 84.

In a similar way, the model monitor 96 may also serve a secondary duty to monitor the predicted meteorological data 80 and current meteorological data 68 to make corrections to the predicted weather data implemented by weather correction function 82. In one embodiment, these corrections may ascertain a difference between predicted meteorological values such as wet bulb or dry bulb temperature, and the actual values that come to pass, and may establish a correction factor or correction offset based on an historical rolling average of these errors. Thus, for example, if the projected dry bulb temperature is always two degrees or one percent low, a suitable correction offset of two degrees or factor of one percent may be implemented.

Figure 9:
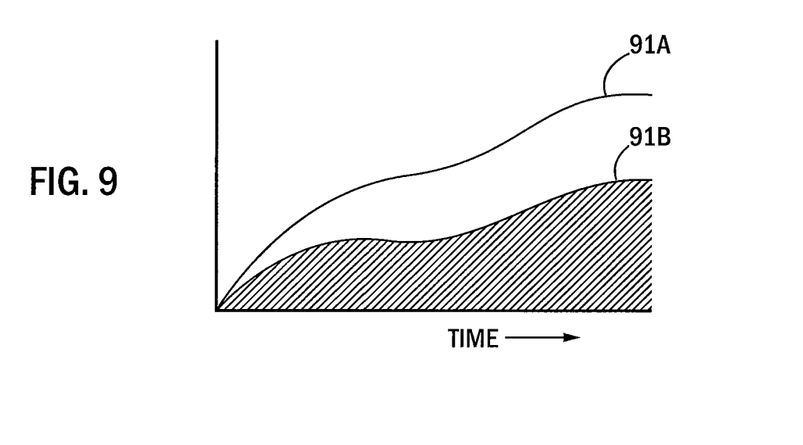
FIG. 9 is a simplified output chart showing energy consumption under a "what if" scenario.

As shown in FIG. 9, the availability of different competing alternative models 100 allows the simultaneous generation of different predicted energy costs 91a and 91b each associated with a different alternative model 100. These different predicted energy costs 91a and 91b may be provided to the user to compare various possible operating modes to guide both current decisions in managing the energy systems 45 of the building 10 and to change the operating rules 74 being used or adjust the operating rules 74 going forward. As depicted, the predicted energy cost 91b associated with a second set of operating rules 74 provides improved energy efficiency over the predicted energy cost 91a associated with the first set of operating rules 74.

Figure 5:
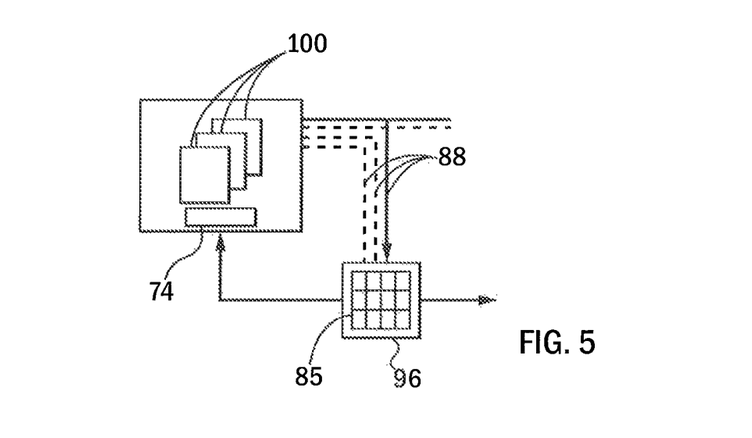
FIG. 5 is a fragmentary block diagram of the modeling system of FIG. 2 showing an implementation of a model corrector comparing predictions from multiple models against actual data to rank and select among models.

As shown in FIG. 5, in an alternative embodiment, the model monitor 96 may simultaneously monitor the outputs of multiple alternative models 100 with respect to the predicted values and actual values ultimately achieved in the same manner as described above with detecting model errors. The success of each model may be logged in a matrix 85, for example, describing the particular model and the particular conditions under which the prediction was made. In this way increased experience with the models 100 may be used to select better models 100 over time.

Figure 3:
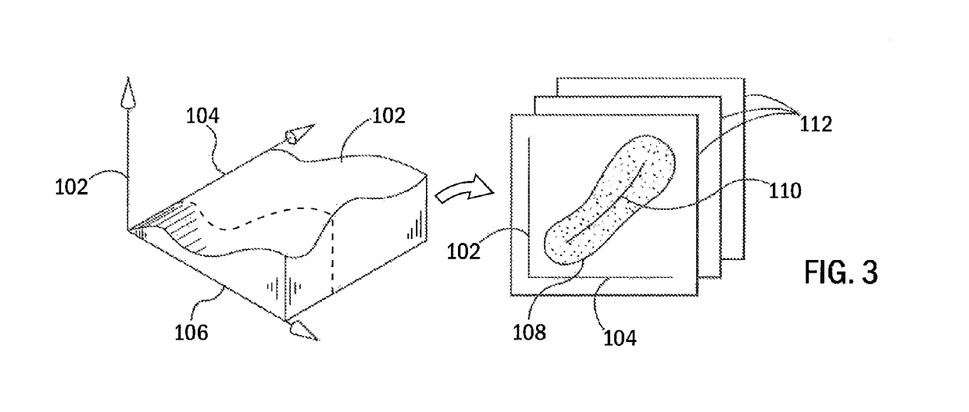
FIG. 3 is a simplified representation of a multidimensional acquisition of historical energy data as may be abstracted into multiple submodels by regression analysis.

Referring now to FIGS. 2 and 3, the alternative models 100 implemented as the building models may be constructed from historical measures of the actual operation of the energy system 45 as captured in one or more submodels 112. Generally, this historical data captured by the submodels 112 will have multiple dimensions, but in a simplified example, a particular model output value may indicate thermal demand 102 for a particular element of the energy system 45 (for example cooling tons for a particular chiller) as a function of input arguments, for example dry bulb temperature 104 and time 106 (e.g. time of day, time of year). This large data set collected over time may be reduced by normalizing it to particular seasons and times of day; for example, data for a constant time of day for a particular season may be collapsed to a single normalized energy usage value by removing a seasonal factor (for example, established by regression analysis) and ensemble averaging over many days of that season. In this way, a scatterplot 108 of points relating dry bulb temperature 104 to thermal demand 102 may be generated that may be corrected to particular times of day and seasons by a simple factor or polynomial adjustment. The scatterplot 108 may then be reduced to a functional curve 110 (for example by linear or polynomial regression) which provides a submodel 112 relating wet bulb temperature 104 to energy usage for the building 10. Multiple functional curves 110 of different arguments and values provide partial submodels 112 relating meteorological data to energy consumption for multiple subsystems of the building, for example an individual air-conditioning unit 36.

Figure 4:
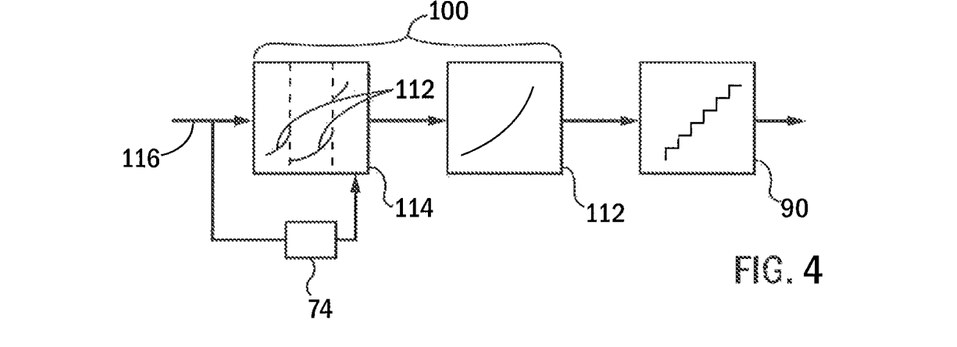
FIG. 4 is a modeling data flow diagram showing the application of predicted meteorological data to a composite model made of the multiple submodel components which may provide results to a second submodel and in turn provide results to a rate table for energy cost estimation.
Figure 7:
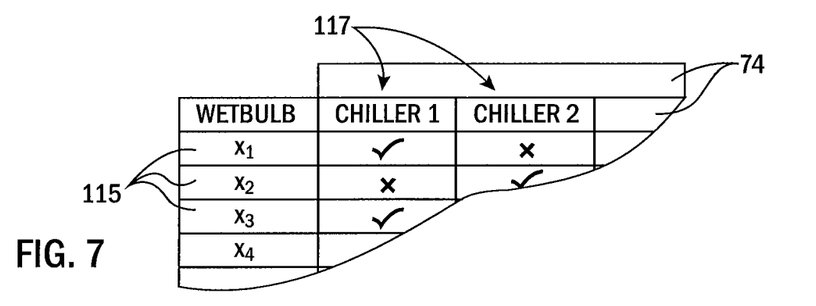
FIG. 7 is an operating rule table working as part of the modeling system to capture standard operating procedures with respect to equipment operation.

Referring now to FIG. 4, the various partial submodels 112 may then be assembled into a composite model 114 by combining the partial submodels 112 together according to operating rules 74, for example, representing current standard operating procedure executed by either the controller 46 or the controller 46 in conjunction with a building engineer. Referring now to FIG. 7, for example, each operating rule 74 may define a priority of equipment usage representing the output control values 117, in this case which chillers to use first, as additional capacity is required as reflected by input arguments 115 of wet bulb temperature. The operating rules 74 in this case generally reflect the switching on and off of systems at different times or different conditions and may be implemented by a set of Boolean or arithmetical conditions in a script for the like or a tabular form as shown.

Most generally, the operating rules 74 capture general strategies for the control of the energy systems 45 of the building 10, for example providing a priority in usage of any of the components of the energy system 45, choice between different fuels, decisions about advanced cooling or heating based on temperature or temperature trends, or the like.

Referring now to FIG. 4, in one embodiment, the operating rules 74 may piece together or otherwise combine the submodels 112 based on operating rule determinations of which equipment and which submodels 112 are relevant. In one example, a composite model 114 may be assembled from portions of different submodels 112 according to operating rules 74 selecting different elements of equipment (associated with different submodels 112) as a function of meteorological data 116 or may be driven by any of the other building states 86. As the different pieces of equipment are used, different submodels are selected.

In this example, a composite model 114 may provide a mapping between meteorological data 116 such as wet bulb temperature, and energy consumption based on a first set of operating conditions. A second submodel 112 may then be used to convert thermal energy load (for example tonnage) to a measure of energy rate (for example kilowatts) that may be converted to cost using a rate table 90.

In a more complete example, meteorological parameters 116 such as wet bulb temperature may be converted by a composite model 114 to plant tonnage, plant tonnage may be related by a submodel 112 to chilled water flow, and plant tonnage and chilled water flow may be converted to total plant consumption in kilowatt hours. The particular combination of composite models 114 and submodels 112 and their arguments and values will be dependent on the interconnection of the various elements of the energy system 45 particular to a given building.

Figure 10:
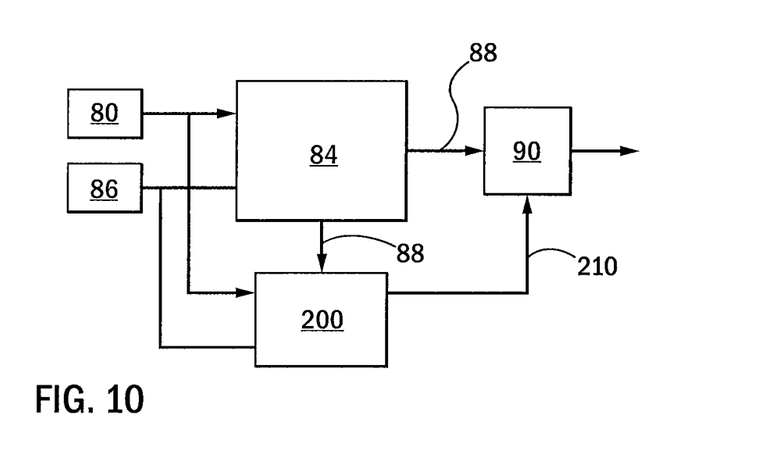
FIG. 10 is a fragmentary view of FIG. 2 having added cogeneration models for use in providing great information.

Referring now to FIG. 10, it will be appreciated that the present invention may be applied to a cogeneration system in which one of the elements of the energy system 45 generates electricity, for example, by using the energy used in the boiler 28 to generate steam to run a steam turbine or the like as well as to heat water. An alternative example of a cogeneration system may be one which uses natural gas from a utility to generate electricity on site and in which the generation of electricity has a byproduct of generating steam that can be used by a steam chiller (that is, a chiller that receives its energy in the form of heated steam). A separate cogeneration model 200 may be produced for such cogeneration systems using the principles described above with respect to the building model 84. The cogeneration model 200 may also receive predicted meteorological data 80 and building state 86 and a predicted energy usage 88 from the model 84 to provide an electrical availability signal 210. This projected available electrical energy 210 may then be used to change the effective rate table 90 (for example by subtracting from the predicted energy usage 88) to indicate a cost of electrical power assuming that the cogeneration system substitutes some electrical power for that normally obtained by the metered public electrical grid.

Figure 11:
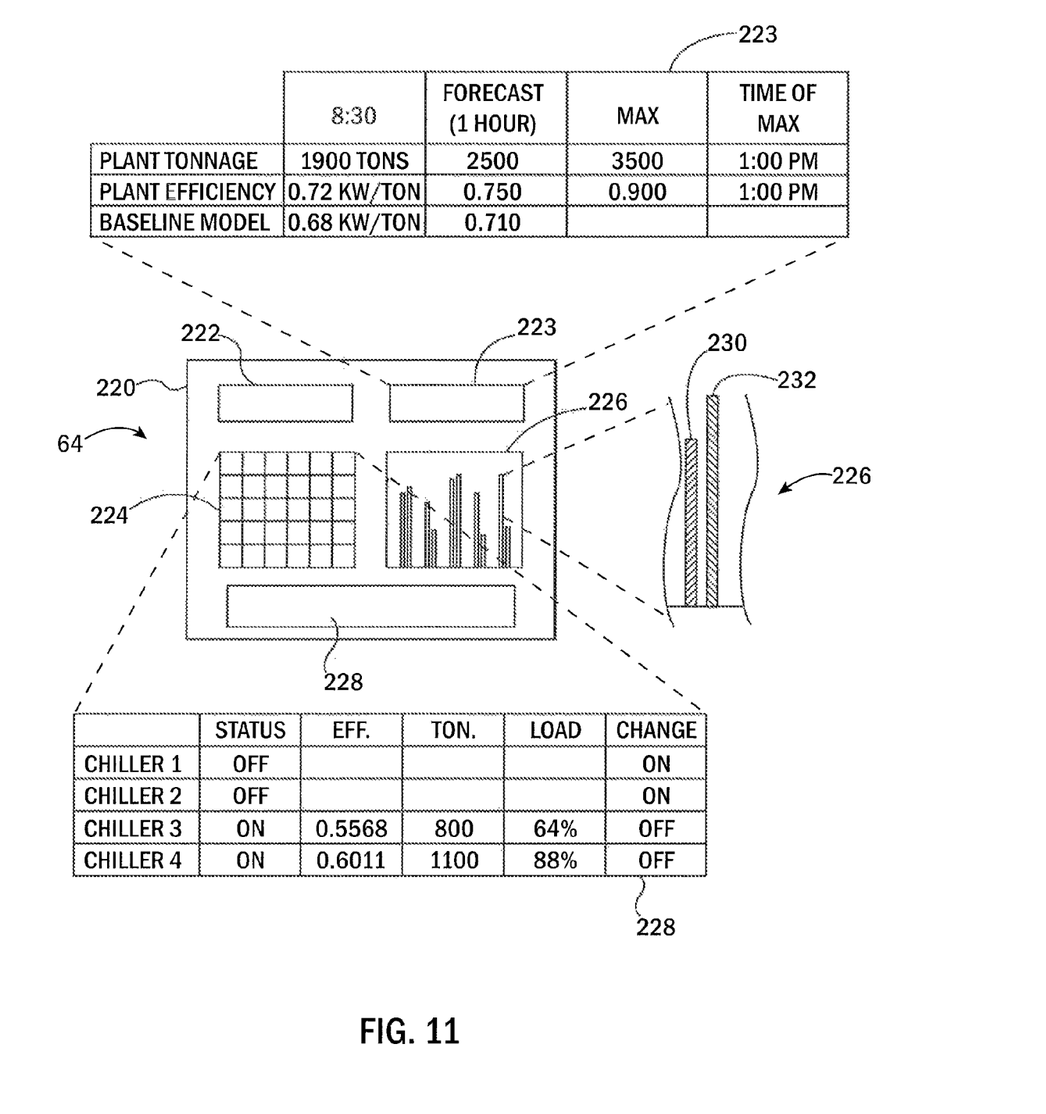
FIG. 11 is a display screen of a computer implementing the present invention as shown in FIG. 1, the display providing a comprehensive view of the results of the modeling process.

Referring now to FIGS. 1 and 11, a screen output 220 on the computer display 64 (shown in FIG. 1) may provide for real-time alerts to the user. In one embodiment, the screen output 22 provides for a number of different fields including current and predicted meteorological data 222, current and projected peak operating parameters 223 (derived from the current and predicted building state 86), current and suggested operating parameters 224 (derived from the current building state and the modeling process of the present invention), a plot of historic and forecasted data 226, and a data dashboard 228 providing other selected information from the building state 86.

The current and predicted meteorological data 222 may simply extract useful information from the predicted meteorological data 80 such as current, forecast, and maximum outside air temperature and current, forecast and maximum outside air wet bulb temperature, including a time at which the maximum will occur. This data helps provide a reference for the other data of the screen output 220.

The current and peak projected operating parameters 223, in a manner roughly analogous to the current and predicted meteorological data 222, provides selected operating parameters of the plant, for example, plant tonnage and plant efficiency, as derived from the building state data 86 for a current time (for example, 8:30 am, as illustrated in FIG. 11) and as forecast one hour into the future using the modeling system of the present invention, and forecast to a maximum value for that day further indicating the time of day when that maximum will occur. This snapshot into the future provides an alert that improves a manager's ability to react in advance to trends in energy usage and efficiency. It will be appreciated that the maximum refers to a maximum of energy usage and may be expressed as plant tonnage, which increases with increased energy usage, or plant efficiency which decreases with increased energy usage or other similar measures.

The current and suggested operating parameters 224 provide information for selected monitored equipment of the energy system 45 indicating its current state, for example, showing which chillers are on and which chillers are off, the realized efficiency tonnage and percent load of the active equipment, and in the final column the recommended change in settings for this equipment based on the modeling provided by the present invention and discussed above. This display may be used to change the settings for controlling the building according to the recommendations of the present invention.

The plot of forecasted data 226 may plot particular parameters throughout the day in the form of a bar chart providing, for example, the intended setpoint value 230 and the actual value 232 for different parameters (for example, chiller electric demand). An absolute difference and percent difference at each time may also be indicated.

It will be appreciated that any of these values described above may also be converted to dollar or money values through the use of the rate table 90 discussed above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" or "a processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A building energy system comprising:
    a building including a ventilation system communicating with heat exchangers for controlling the temperature of circulated air in the ventilation systems;
    a series of sensors providing first to data inputs of real-time measurements of the ventilation system providing parameters of the building energy system;
    an electronic computer communicating with the series of sensors and executing a program stored in a non-transient medium to:
    (a) receive first data inputs of real-time measured parameters of the energy systems;
    (b) receive second data inputs of current and predicted local meteorological information;
    (c) apply predicted local meteorological information and real-time measured parameters of the first and second inputs to a model of the energy system to produce predicted parameters of the energy system;
    (d) apply the predicted and measured parameters to alert rules to generate alerts related to future avoidable energy cost increases; and
    (e) output the alerts providing information indicating a future avoidable cost increase and a prediction time associated with a predicted time of the future avoidable energy cost increase
    wherein the electronic computer further executes the stored program to output to a user the predicted measured parameters;
    wherein the electronic computer further executes the program to apply predicted local meteorological information to a second model of the energy system to produce predicted electrical and steam cogeneration wherein the output from the second model provides an input to the model.

2. The apparatus of claim 1 wherein the information indicating a future avoidable cost increase is a maximum for a current day expressed in at least one of plant tonnage and plant efficiency.

3. The apparatus of claim 1 wherein the model consists of historical operating data of the energy system providing a functional relationship between meteorological data and energy usage.

4. The apparatus of claim 3 wherein the model includes at least two submodels, a first submodel relating meteorological data to output of the energy system and the second submodel relating output of the energy system to energy use of the energy system and wherein each model is obtained by a regression fit to historical data.

5. The apparatus of claim 4 wherein the first submodel provides an output of cooling tons and the second submodel provides an output of power usage.

6. The apparatus of claim 3 wherein the model further includes operating rules describing a selection among different of corresponding submodels associated with different configurations of the energy system based on the meteorological data and reflecting expected different configurations of the energy system in response to different meteorological conditions.

7. The apparatus of claim 6 wherein the operating rules change submodels according to different ranges of meteorological data.

8. The apparatus of claim 1 wherein the electronic computer further executes the program to output to a user the predicted and measured parameters based on different operating rules to provide a comparison of future performance under different operating rules.

9. The apparatus of claim 1 wherein the electronic computer further executes the program to compare predictions of the model to later actual measurements of the energy system and to provide at least one of an alert indicating disparity between the predictions and the actual measurements, a selection of a different model, and a cumulative ranking of models.

10. The system of claim 1 wherein execution of the program further corrects the predicted local meteorological information by comparing historical predicted local meteorological information and corresponding historical actual meteorological information.

11. The system of claim 1 wherein the electronic computer further executes the program to repeatedly apply the predicted local meteorological information and real-time measured parameters of the first and second inputs to the model to produce new predicted measured parameters of the energy system at multiple times throughout a day.

12. The apparatus of claim 1 wherein the electronic computer further executes the program to monitor the real-time measured parameters for error selected from the group consisting of sensor data that is missing, sensor data that is unvarying and, sensor data that is out of range to provide an alert of such error.

13. The system of claim 1 wherein the alerts indicate a projected change in energy cost categories according to a utility rate table.

14. The apparatus of claim 1 wherein the alerts include cost values indicating a future avoidable cost increase related to the alert based on a utility rate table.

15. The system of claim 1 wherein the local meteorological data is selected from the group consisting of wet bulb temperature of air outside of a structure serviced by the energy system.

16. The system of claim 1 wherein the real-time measured parameters are selected from the group consisting of cooling, system output tonnage, electrical power usage, and activation of particular energy system components.

17. The system of claim 1 wherein the model of the energy system is selected from the group consisting of models of energy systems of furnaces, boilers, air-conditioning units, water chillers, cogeneration facilities and combinations of these energy systems.

* * * * *